United States Patent [19]
Kalina

[11] 4,361,186
[45] Nov. 30, 1982

[54] FORMATION FLOW CHANNEL BLOCKING

[76] Inventor: Alexander I. Kalina, 12439 Millbanks, Houston, Tex. 77031

[21] Appl. No.: 204,626

[22] Filed: Nov. 6, 1980

[51] Int. Cl.³ ...................... E21B 33/138; E21B 43/22
[52] U.S. Cl. .................................. 166/295; 166/270; 166/273
[58] Field of Search ............................. 166/292–295, 166/273, 270

[56] References Cited

U.S. PATENT DOCUMENTS

| | | | |
|---|---|---|---|
| 2,747,670 | 5/1956 | King et al. | 166/270 |
| 2,761,511 | 9/1956 | Billue | 166/295 X |
| 3,251,414 | 5/1966 | Willman | 166/295 |
| 3,323,589 | 6/1967 | Harvey | 166/292 X |
| 3,396,790 | 8/1968 | Eaton | 166/270 |
| 3,724,549 | 4/1973 | Dill | 16/295 X |
| 3,762,475 | 10/1973 | Marx | 166/292 X |
| 3,762,476 | 10/1973 | Gall | 166/295 X |
| 3,805,893 | 4/1974 | Sarem | 166/270 |
| 4,182,417 | 1/1980 | McDonald et al. | 166/295 |

OTHER PUBLICATIONS

Cort—Enhanced Oil Recovery Products . . . Services.

*Primary Examiner*—Stephen J. Novosad
*Attorney, Agent, or Firm*—Arnold, White & Durkee

[57] ABSTRACT

A method of selectively blocking high permeability flow channels in an underground hydrocarbon material bearing formation having flow channels of high permeability and having flow channels of lesser permeability. The method includes the steps of introducing a blocking material fluid comprising a blocking material in a carrier into the flow channels through an injection well in communication with the formation, introducing a buffer fluid into the formation through the injection well for the buffer fluid to displace the blocking material fluid away from the injection well, allowing the blocking material to settle in the channels to resist displacement by fluid flowing through the channels, introducing a quantity of an activating fluid into the channels through the injection well at a sufficient rate for the activating fluid to displace the buffer fluid and finger into the high permeability channels to reach the blocking material in the high permeability channels without reaching the blocking material in the low permeability channels, the activating fluid being adapted to activate the blocking material which it reaches to cause blocking of the high permeability channels.

23 Claims, 1 Drawing Figure

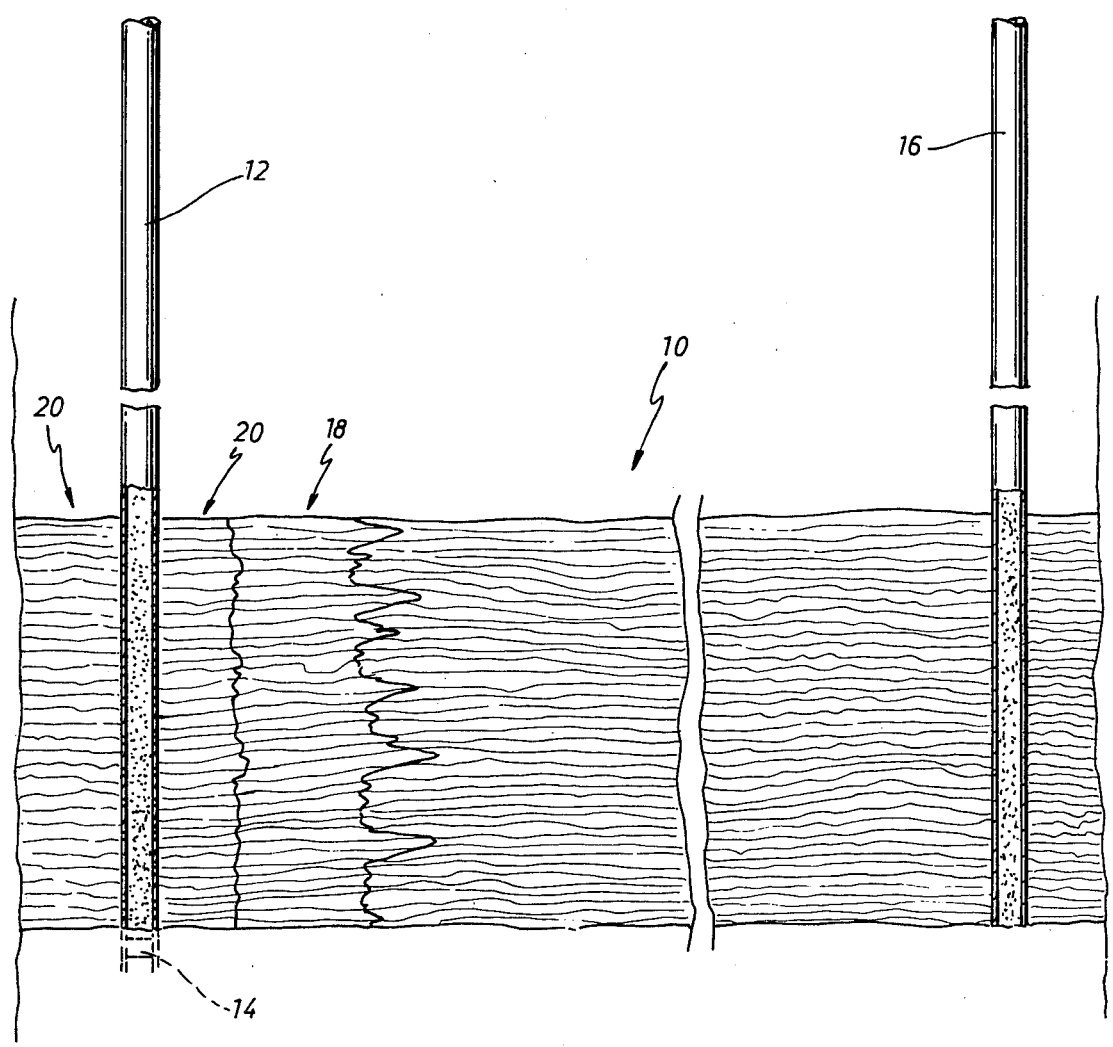

FORMATION FLOW CHANNEL BLOCKING

This invention relates to formation flow channel blocking. More particularly, this invention relates to a method of blocking channels in valuable material bearing formations to enhance the recovery of valuable materials from such formations. In particular, this invention relates to a method of selectively blocking high permeability channels in a hydrocarbon material bearing formation to enhance and/or facilitate the recovery of hydrocarbon material from such formations.

In general, secondary recovery of hydrocarbon material from hydrocarbon material bearing formations involves flooding the formation with water or an appropriate flooding solution to displace hydrocarbon material contained in the formation to a production well for the recovery of the hydrocarbon material. In practice the flooding solution mixes with the hydrocarbon material in the formation for the recovery of hydrocarbon material from the mixture produced at a production well.

Hydrocarbon material bearing formations generally have channels of varying permeability which extend through the formation. During secondary recovery of hydrocarbon material contained in the channels of the formation, flooding liquid will pass more readily and more rapidly through the most permeable channels than through the lesser permeable channels. As a result, the hydrocarbon material contained in the more permeable channels will tend to be washed out of the formation fairly rapidly, and the major proportion of flooding liquid will tend to flow through the more permeable channels.

The flooding liquid thus fingers through the formation, with the extent of fingering increasing as the pressure drop between an injection well and the production wells increases.

It follows therefore that once secondary recovery has been in progress for a limited time, the proportion of oil to flooding liquid in the production wells decreases substantially until the stage is reached where the recovery is no longer commercially viable. At that stage, the less permeable channels frequently contain a substantial residue of hydrocarbon material which cannot be recovered economically. The same types of disadvantages are usually presented when tertiary recovery is attempted.

Various attempts have been made to block certain channels in such formations to improve the recovery of hydrocarbon material therefrom. As far as applicant is aware all attempts have been unsuccessful since they have been unable to provide for selective blocking of only the most permeable channels, thereby leaving the lesser permeable channels unblocked for recovery of oil or other hydrocarbon material from such lesser permeable channels.

It is accordingly an object of this invention to provide a method for selectively blocking high permeability channels in a valuable material bearing formation to enhance the recovery of valuable material from the formation by permitting effective recovery from lesser permeable channels in such a formation.

In accordance with this invention a method of blocking high permeability flow channels in a hydrocarbon material bearing formation having flow channels of high permeability and flow channels of lesser permeability extending along the formation, comprises:

(a) introducing a blocking material fluid comprising a blocking material and a carrier fluid, into the flow channels through an injection well in communication with the formation;

(b) introducing a buffer fluid into the formation through the injection well for the buffer fluid to displace the blocking material fluid away from the injection well;

(c) allowing the blocking material to separate from the carrier fluid to deposit in the channels to resist displacement by fluid flowing through the channels;

(d) introducing a quantity of an activating fluid into the flow channels through the injection well to displace the buffer fluid and thus the carrier fluid along the channels, the quantity and rate of introduction of the activating fluid being controlled for the activating fluid to finger into the high permeability channels and reach the deposited blocking material in those channels without reaching the blocking material in the lesser permeable channels, the activating fluid being adapted to activate the blocking material which it reaches in the high permeability channels to cause blocking of those channels.

In this specification by "high permeability" channels is meant those channels in a formation which are more permeable than the remaining channels in that region of the formation and which, because of their higher permeability, allow flooding liquids employed in flooding techniques during secondary or tertiary recovery procedures, to flow preferentially through them.

In practice, the higher the permeability of a particular channel, the more readily will a flooding liquid flow through that channel. As a result hydrocarbon material contained in the channels of high permeability will tend to be washed out of those channels during flooding while hydrocarbon material contained in the channels of lesser permeability will tend to be driven out only partially.

In the ideal situation, the method of this invention would be performed to block only those high permeability channels which do not contain hydrocarbon materials or which have been exhausted of hydrocarbon material, or those high permeability channels which have been exhausted of hydrocarbon material to the extent that preferential flooding through those channels has reached the stage where recovery of hydrocarbon material from that zone of the formation has become uneconomical.

The method of this invention may therefore be employed in such a manner to block only the channels of highest permeability, or to block channels having a range of high permeability in relation to the remaining channels, as required for any particular application. It will further be appreciated that in carrying out the invention, channels of high permeability may be blocked, whereafter recovery may be continued until further channels which are of high permeability relatively to the remaining channels have developed which require blocking. Thereafter the method may be carried out to block those new channels of high permeability relatively to the remaining channels, and so on until economic considerations indicate that further blocking is impractical.

In practice, as is conventional in secondary recovery of hydrocarbon materials, at least one injection well will be provided which extends through the hydrocarbon material bearing formation, and which is perforated throughout the zone in communication with the formation, while circumferentially spaced production wells will be provided in an annular zone around the injection well.

The blocking material fluid and buffer fluid introduced will therefore be in the form of annular plugs around the injection well with the buffer fluid annular plug separating the blocking material fluid annular plug from the injection well.

In one preferred embodiment of the invention, the blocking material fluid is such that the blocking material is capable of separating out from the carrier fluid after a time delay or when the blocking material fluid is at rest to become resistant to displacement along the channels.

In this preferred embodiment, the buffer fluid is injected into the injection well to displace the blocking material fluid away from the injection well before the blocking material commences to separate out from the mixture.

The buffer fluid may conveniently be introduced into the formation such that a generally uniform interface can be provided between the buffer fluid and the blocking material fluid plugs.

In one example of this aspect of the invention, the buffer fluid may be introduced into the formation at a sufficiently low rate to limit the degree of fingering of the buffer fluid into the high permeability channels thereby providing a relatively uniform flow distribution curve at the leading end of the plug of buffer fluid and thus a generally uniform interface between the plugs of buffer fluid and blocking material.

As will be appreciated, the flow distribution curve of a fluid introduced into such a formation having channels of variable permeability, will be related directly to the degree of permeability of the various channels, and to the pressure drop through the formation as well as the flow rate through the formation.

In an alternative example of this aspect of the invention, the buffer fluid may be in the form of a relatively viscous liquid which is introduced slowly to provide a generally uniform flow distribution curve.

In this example of the invention, the buffer fluid is preferably a fluid which has an appropriate viscosity when formed, but in which the viscosity decreases with time. Thus when the buffer fluid is subsequently displaced into the channels by the activating fluid, it will tend to be displaced less uniformly and will present a reduced tendency to displace blocking material placed in the flow channels.

Various fluids are known to those skilled in the art which are viscous when formed and which then lose their viscosity over a period of hours or days. An appropriate buffer fluid for the method of this invention may therefore be produced by conventional techniques or selected from any of those known to persons of ordinary skill in the art.

In one example of the invention, the blocking material may be a liquid or solid which is dissolved or dispersed in a carrier fluid, and which is capable of precipitating or separating out from the carrier fluid when the blocking material fluid is in position in the channels for the blocking material to settle or deposit in the channels or adhere to the walls defining the channels and become resistant to further displacement along the channels by fluid flowing in the channels during introduction of the activating fluid.

The blocking material fluid may therefore be a fluid in which separation or precipitation will occur after a time, at temperature conditions prevailing in the formation, as a result of a chemical or physical reaction, or as a result of deterioration of the carrier fluid after a time period sufficient to allow the blocking material fluid to be placed in the required position within the formation.

A person of ordinary skill in the art would readily be able to select or produce blocking material fluids which have the requisite properties.

In an alternative example of the invention, the blocking material fluid may comprise a blocking material in particulate form in suspension in the carrier fluid.

In one example of this aspect of the invention, the specific gravity of the precipitate blocking material in relation to the specific gravity of the carrier fluid may be such that the blocking material will settle out of the carrier fluid when the fluid is at rest in the channels.

The relative specific gravities may be adjusted in relation to the time period involved in introducing the blocking material fluid into the formation and then displacing the blocking material fluid away from the injection well by means of the buffer fluid.

Where the carrier fluid is, for example, water, the particles of blocking material may, for example, have a specific gravity of between about 1.05 and 1.1 to permit settling of the blocking material particles within 2 to 3 days.

Where the carrier fluid is a brine solution or a solution other than water, the specific gravity of the blocking material particles may be adjusted such that the particles will again commence settling after the desired lapse of time.

The particles of the particulate blocking material may conveniently be adapted to agglomerate to cause or facilitate settling and to present sufficient resistance to displacement by fluid flowing through the channels.

In one example of this aspect of the invention, the carrier fluid may include an agglomeration agent to cause the particles to agglomerate when the blocking material fluid is at rest in the channels. Alternatively, the particulate blocking material may inherently be such that the particles will tend to agglomerate after an adequate lapse of time to permit agglomeration to commence only once the blocking material mixture has been placed in position in the formation.

In one example of the invention, the particulate blocking material may be a material which is partially soluble in the carrier fluid so that the particles will tend to become tacky after a time to cause them to adhere, settle out from the carrier fluid and, because of the increased size of the particles, to be resistant to displacement by fluid flowing through the channels.

In an alternative example of the invention, where the carrier fluid is, for example, a fluid such as water or an aqueous solution, the carrier fluid may include a solvent for partially dissolving surface areas of the blocking material particles to cause them to adhere to each other.

In further alternative examples of the invention, the agglomeration agent may be an agent which causes the particles to agglomerate or adhere to each other as a result of a chemical or physical attraction produced between the particles.

Various types of agglomeration agents are known to those skilled in the art. Suitable agglomeration agents may therefore be selected from the known agglomeration agents for inclusion in the blocking material mixture or carrier fluid.

In an alternative example of this aspect of the invention, the carrier fluid may include a mixing agent which is adapted to maintain the blocking material in admixture with the carrier fluid, with the mixing agent being adapted to deteriorate with time or merely being adapted to delay separation for a time to permit the blocking material to separate out and become positioned in the flow channels after the fluid is in its desired position in the formation.

Where the carrier fluid is a fluid such as water or an aqueous solution, starch, water soluble polymers, or the like may for example be incorporated in the carrier fluid to maintain blocking material in particulate form in suspension in the carrier fluid for a sufficient period before significant settling or separation commences.

In a further alternative example of the invention, the particulate blocking material may be a material which will tend to adhere or become attached to the walls defining the channels on separation from the carrier fluid and thus become resistant to displacement along the channels.

In a preferred embodiment of the invention, the blocking material is a synthetic plastics material while the carrier fluid comprises an aqueous solution.

In this preferred embodiment of the invention, the synthetic plastics material is preferably a material adapted to be activated by the activating fluid to expand for blocking the high permeability channels.

It will be appreciated that in the context of this specification, whenever reference is made to "blocking" of high permeability channels, this is intended to mean not only complete blocking of these channels but additionally partial blocking of these channels.

It will be appreciated that even a partial blocking of high permeability channels in a hydrocarbon material bearing formation will provide for improved recovery of hydrocarbon material from the formation when utilizing flooding techniques for the recovery of such materials.

In one preferred embodiment of the invention, the blocking material may be in the form of a thermoreactive material, such as, for example, a thermoreactive synthetic plastics material, which is adapted to expand upon being heated to its reaction temperature for blocking the channels. In this embodiment of the invention, the method comprises introducing the activating fluid at a temperature to heat the blocking material to its reaction temperature when it reaches the blocking material in the high permeability channels, while thermal insulation provided in the lesser permeable channels by the buffer fluid which is between the activating fluid and the blocking material, can prevent heating of the blocking material in the less permeable channels to its reaction temperature.

In this preferred embodiment of the invention, the blocking material is therefore, for example, in the form of, or includes, a thermoreactive foamable or expandible polymer such as, for example, a polystyrene or polyacrylic material, or a combination thereof.

The method may therefore include the step of discontinuing the supply of activating liquid once a desired degree of blocking has occurred and then of merely permitting the activating fluid to cool.

In yet a further alternative example of the invention, the activating fluid may be in the form of a fluid adapted to react chemically with the blocking material to cause the blocking material to block the high permeability channels.

In this example of the invention the quantity of activating fluid will again be controlled by discontinuing the supply thereof when the flow rate at constant pressure has decreased by a desired degree to indicate a desired degree of blocking.

The activating fluid may be a fluid which can either be neutralized to prevent reaction between the activating fluid and the blocking material in the lesser permeable channels after the activating fluid has reacted with the blocking material in the high permeability channels, or may be an activating fluid which becomes unreactive after the lapse of a suitable period of time.

Various synthetic plastics materials are known to those skilled in the art which are expandable or foamable and which are capable of being chemically or thermally activated. Appropriate materials may therefore be selected from the group of materials known to those skilled in the art.

The invention further extends to a method of blocking high permeability flow channels in a formation having flow channels of high permeability and flow channels of lesser permeability extending along the formation, which comprises:

(a) introducing an expandible blocking material in a carrier fluid into the flow channels of the formation through an injection zone;

(b) introducing a buffer fluid into the formation through the injection zone to displace the carrier fluid and blocking material away from the injection zone to form a plug of blocking material and carrier fluid separated from the injection zone by a plug of buffer fluid, the buffer fluid being introduced to limit the degree of fingering thereof into the high permeability channels and thus provide a generally uniform interface between the two plugs;

(c) allowing the blocking material to separate out from the carrier fluid and deposit in the channels to resist displacement by fluid flowing through the channels, the blocking material being such that it does not significantly interfere with the permeability of the channels;

(d) introducing a quantity of an activating fluid into the channels at a sufficient rate for the activating fluid to present a sufficient velocity distribution between its velocity in the high permeability channels and its velocity in the lesser permeable channels for the activating fluid to finger into and reach the blocking material in the high permeability channels without reaching the blocking material in the lesser permeable channels, for the activating fluid to activate the blocking material which it reaches for the blocking material to expand to at least partially block the high permeability channels; and (e) controlling the quantity of activating fluid introduced into the channels to prevent the activating fluid from reaching the blocking material in the lesser permeable channels.

In carrying out the method of this invention, whether the blocking material is a liquid or a particulate blocking material, the blocking material is such and its distribution in the carrier fluid is such that when it has separated from the carrier fluid and has settled, has deposited in the channels, or has adhered to the walls defining the channels, it will not significantly affect further fluid flow through the channels. Thus displacement of the carrier fluid and the buffer fluid during introduction of the activating fluid can occur while at least some blocking material remains in position in the channels for activation when reached by the activating fluid.

While the method of this invention may be used wherever channels of varying permeability are encountered, and where channels of high permeability are to be blocked preferentially to channels of lesser permeability, this invention has particular application in regard to underground or subterranean formations which contain channels of varying permeability from which a valuable material or mineral is to be recovered by flooding, leaching or washing.

The invention does, however, have specific application in regard to the recovery of hydrocarbon material from underground hydrocarbon bearing material formations.

A preferred embodiment of the invention is now described by way of example with reference to the accompanying drawing.

The drawing shows a diagrammatic, fragmentary, vertical section of portion of an underground oil bearing formation.

In the drawing reference numeral 10 refers generally to an underground oil bearing formation having a plurality of channels of varying permeability extending along the formation, with the channels being generally parallel to the surface of the formation 10.

The formation 10 is penetrated by an injection well 12 which extends through the formation 10.

The injection well 12 includes a packer 14 positioned immediately below the formation to seal the injection well 12 and, throughout the length of the injection well in communication with the formation 10, the injection well 12 is perforated.

The formation 10 is further penetrated by a plurality of production wells 16 (only one being shown in the drawing), with the production wells 16 being arranged at circumferentially spaced intervals in an annular band surrounding the injection well 12.

In recovering hydrocarbon bearing material from the formation 10, once the internal formation pressure has reduced to the stage where the rate of oil production from the production well 16 has become insufficient, conventional flooding such as water flooding, is employed to recover further hydrocarbon material from the formation 10. Thereafter chemical flooding is normally attempted in tertiary recovery techniques.

During such water or chemical flooding, the water or chemical will flood preferentially through the high permeability channels in the formation thereby tending to exhaust hydrocarbon material from the high permeability channels.

As the high permeability channels become exhausted, the proportion of flooding water to oil in the produced well fluid increase until a stage is reached where further recovery becomes uneconomical.

At that stage selective blocking of the high permeability channels becomes essential to enable further recovery of oil from the formation 10 on an economical basis.

Generally, hydrocarbon bearing material formations such as the formation 10 will have flow channels having cross sections varying from a maximum of one or more millimeters down to flow channels having flow cross sections measured in microns.

For selective blocking of the high permeability channels in accordance with the method of this invention, a blocking material fluid will be prepared by, in the preferred embodiment, preparing a carrier liquid of water, brine or other aqueous solution containing a suspension of foamable polystyrene material in particulate form as the blocking material.

The polystyrene material particles will be of a size such that the particles can easily pass through the flow channels, and so that a stable suspension can be formed in which the particles will remain suspended in the water or other carrier fluid for about 2 to 3 days.

If necessary, the density of the carrier fluid may be increased by incorporating, for example, starch or a suitable soluble polymer in the carrier fluid.

Once the suspension is formed, it is immediately injected into the channels of the formation 10 through the injection well. A sufficient quantity is injected to insure that sufficient blocking material particles will remain in the high permeability channels for carrying out the objective of this invention.

Immediately after the blocking material fluid has been introduced into the formation 10, a buffer liquid such as, for example, water or a salt solution is injected into the formation 10 through the injection well 12.

Injection of the buffer liquid will preferably be effected at a sufficiently slow rate for the buffer liquid profile to be as uniform as possible. Alternatively, or additionally, a relatively viscous liquid may be used as the buffer fluid.

In other words, the buffer liquid is introduced so as to avoid undue fingering of the buffer liquid into the high permeability channels to provide a distribution profile which is as uniform as conveniently practical while ensuring that the blocking material fluid is displaced before the blocking material commences to settle out.

Sufficient buffer liquid is introduced to displace the blocking material mixture a distance of between about 1 to 3 meters away from the injection well 12.

This will therefore produce an annular plug 18 of blocking material fluid in the formation 10, which is separated from the injection well 12 by an annular plug 20 of buffer liquid.

The foamable or expandable polystyrene particulate material in the blocking material mixture may be such that it is partially hygroscopic. Thus, once the mixture is at rest in the formation 10 in the plug 18, the particles will absorb water to swell and to agglomerate thereby facilitating settling out of the carrier liquid.

Alternatively, a solvent for the particulate blocking material, such as for example an olefin, may be incorporated in the carrier fluid for partially dissolving surface zones of the polystyrene material particles, thereby encouraging the particles to become tacky and to agglomerate by adhering to each other. This can facilitate separation of the agglomerated particles from the carrier liquid and settling of the particles in the flow channels.

Because of the increased mass of the particles, they will be resistant to resuspension in liquid in the flow channels during the subsequent steps of the method.

Alternatively, the tackiness of the particles may merely be caused for the purpose of causing the particles to adhere to the walls of the channels when they have settled out.

Once the particles of blocking material have settled out of the carrier fluid after a lapse of time to say 2 or 3 days and have become deposited in the flow channels of the formation 10, an activating fluid in the form of hot water or a hot aqueous solution is introduced into the formation 10 through the injection well 12.

The activating liquid is introduced at a sufficient rate to produce distinct fingering of the activating liquid into the high permeability channels, and thus a distinct distribution profile in the formation 10 which is directly related to the permeability of the channels of the formation.

The activating liquid introduced into the formation 10 will thus finger into the channels of the formation to displace the buffer liquid in the plug 20, which in turn displaces the carrier liquid in the plug 18.

However, because of the rate of introduction of the activating liquid, the activating liquid will reach the deposited blocking material particles in the high permeability channels before it reaches the blocking material in the lesser permeable channels.

The temperature of the activating liquid is controlled so that when the activating liquid reaches the deposited blocking material particles in the high permeability channels, its temperature will be sufficient in relation to the reaction temperature of the polystyrene material to heat the polystyrene material to its reaction temperature thereby causing the polystyrene material to expand substantially to block the high permeability channels.

The temperature is controlled so that when the activating liquid reaches the deposited blocking material particles in the high permeability channels, the activating liquid will still be separated by a sufficient quantity of buffer liquid from the deposited blocking material in the lesser permeable channels for the thermal insulation of the buffer liquid to prevent activation of such blocking material.

Because the particulate blocking material has agglomerated and become deposited in the channels or has adhered to the walls of the channels, the agglomerated or adhering particulate blocking material will be resistant to displacement along the channels during introduction of the activating liquid. The rate of introduction of the activating liquid will be controlled below a displacement rate to insure that a sufficient number of agglomerated particles will remain in the high permeability channels for access by the activating liquid.

Because of the ability of the particulate foamable polystyrene to expand dramatically, it will be appreciated that activation of relatively few blocking material particles will generally be sufficient to block the high permeability channels.

For this reason the proportion of blocking material particles in the carrier liquid of the blocking material mixture may be extremely low. Applicant believes that amounts of particulate material less than about 1% by weight and possibly substantially less than 1% by weight should be adequate.

The particulate blocking material particles will be sufficiently small in relation to the channel sizes, and the proportion of blocking material in the carrier liquid will be sufficiently low to ensure that single or agglomerated particles deposited in the channels will not significantly vary the permeability of the channels or interfere with fluid flow along the channels unless the particles are activated.

The particles will therefore preferably be smaller than the smaller flow channel cross-sections by an order of magnitude, and the proportion by weight of particles in the carrier fluid will be low. Since a typical polystyrene material can expand several hundred times its original size, it will be appreciated that a few deposited particles can expand to block or sufficiently block a channel.

The quantity of activating liquid introduced into the formation 10 will be controlled in relation to the degree of channel blocking which is required to insure that lesser permeable channels do not become blocked.

The quantity of activating liquid may be controlled from the basis of the decrease of introduction rate of activating liquid at constant pressure in response to blocking of the high permeability channels. In other words, when the flow rate decreases by a desired percentage, injection of activating liquid will be stopped.

The activating liquid in the formation, which is separated from the particulate blocking material in the lesser permeable channels by the buffer fluid will cool down and will therefore be effectively neutralized against activating the particulate blocking material in the lesser permeable channels.

Once the high permeability channels have become blocked and the activating liquid has cooled down, conventional secondary or tertiary recovery techniques may then be employed to recover oil or hydrocarbon material from the remaining lesser permeable channels.

When further high permeability channels have developed, that is when the more permeable channels of the remaining channels have become exhausted or substantially exhausted of oil or hydrocarbon material, the method of this invention may be repeated to block further relatively high permeability channels. Thus further recovery from the remaining lesser permeable channels can be effected by flooding. This process may be continued until further recovery is no longer justified.

It will be appreciated from the example of the invention given in regard to the preferred embodiment, that this preferred embodiment relies essentially on the placing of an appropriate particulate material in the formation 10 in a position where it is separated from the injection well by a buffer zone, and in the introduction of an activating liquid at a sufficient rate for the activating liquid to displace the buffer liquid and thus the carrier liquid preferentially in the high permeability channels so that the activating liquid can react with the blocking material particles in those channels before the activating liquid can react with the blocking material particles in the lesser permeable channels.

Thereafter, without the activating liquid reaching the blocking material particles in the lesser permeable channels, the activating liquid is specifically neutralized by, in this preferred embodiment, merely allowing the activating liquid to cool below the reaction temperature of the particulate blocking material.

It will be appreciated, therefore, that various different chemicals or combinations of chemicals, known to those persons of ordinary skill in the art, can be selected in carrying out the essential techniques of this invention. The particular selection of specific blocking materials, carrier fluids, buffer fluids and activating fluids will be determined largely by considerations of availability, operating conditions and economics.

This invention can provide the advantages that high permeability flow channels can be blocked selectively by controlling the quantity of activating fluid introduced into the formation, and that the activating fluid will itself automatically select the channels of high permeability for selectively blocking those channels.

The method provides the particular advantage that by introducing the activating fluid at a high rate to provide effective fingering into the high permeability channels, the activating fluid will automatically finger into and thus preferentially select and block those channels which present the highest actual permeability between the injection well and production wells. This will occur equally effectively throughout the depth of the formation as well as circumferentially around the injection well, and will not be affected by localized zones of varying permeability in any particular flow channel.

It will further be appreciated that by using appropriate blocking material, blocking can be reversed, if required, by employing an appropriate solvent.

I claim:

1. A method of blocking high permeability flow channels in a hydrocarbon material bearing formation having flow channels of high permeability and flow channels of lesser permeability extending along the formation, which comprises:
   (a) introducing a blocking material fluid comprising a blocking material and a carrier fluid, into the flow channels through an injection well in communication with the formation;
   (b) introducing a buffer fluid into the formation through the injection well for the buffer fluid to displace the blocking material fluid away from the injection well;
   (c) allowing the blocking material to separate from the carrier fluid to deposit in the channels to resist displacement by fluid flowing through the channels;
   (d) introducing a quantity of an activating fluid into the flow channels through the injection well to displace the buffer fluid and thus the carrier fluid along the channels, the quantity and rate of introduction of the activating fluid being controlled for the activating fluid to finger into the high permeability channels and reach the deposited blocking material in those channels without reaching the blocking material in the lesser permeable channels, the activating fluid being adapted to activate the blocking material which it reaches in the high permeability channels to cause blocking of those channels.

2. A method according to claim 1, in which the buffer fluid is introduced into the formation to limit the degree of fingering of the buffer fluid into the high permeability channels thereby providing a generally uniform interface between the buffer fluid and blocking material fluid in the formation.

3. A method according to claim 2, in which the blocking material fluid is such that the blocking material is capable of separating out from the carrier fluid after a time delay, and in which the blocking material fluid is displaced by the buffer fluid before the blocking material separates out.

4. A method according to claim 3, in which the blocking material fluid comprises blocking material in particulate form in suspension in the carrier fluid.

5. A method according to claim 4, in which the specific gravity of the particulate blocking material in relation to the specific gravity of the carrier fluid is such that the blocking material will settle out of the carrier fluid when the mixture is at rest in the channels.

6. A method according to claim 4 or claim 5, in which the particles of the particulate blocking material are adapted to agglomerate to encourage settling and to cause the agglomerated particles to be resistant to displacement by fluid flowing through the channels.

7. A method according to claim 6, in which the particle sizes and the particle distribution in the carrier fluid are such that the agglomerated particles will not significantly restrict fluid flow through the channels in which they are deposited.

8. A method according to claim 6, in which the blocking material fluid includes an agglomeration agent to cause the particles to agglomerate when the blocking material fluid is at rest in the channels.

9. A method according to claim 8, in which the agglomeration agent is a solvent for the particles to render the particle surfaces tacky for the particles to agglomerate by adhering to each other.

10. A method according to claim 1 or claim 4, in which the carrier fluid includes a mixing agent to maintain the blocking material in admixture with the carrier fluid, the mixing agent being adapted to allow the blocking material to separate out after a time.

11. A method according to claim 4, in which the blocking material comprises a synthetic plastics material.

12. A method according to claim 11, in which the synthetic plastics material is a material adapted to be activated by the activating fluid to expand for blocking the high permeability channels.

13. A method according to claim 12, in which the synthetic plastics material is a thermoreactive material, and in which the activating fluid is introduced at a sufficient temperature to activate the synthetic plastics material which it reaches.

14. A method according to claim 1 or claim 4, in which the blocking material is adapted to adhere to the surfaces defining the channels upon separating from the carrier fluid to cause the blocking material to deposit in the channels and become resistant to displacement along the channels.

15. A method according to claim 1, in which the blocking material is a thermoreactive material which is adapted to expand upon being heated to its reaction temperature for blocking the channels, and in which the activating fluid is introduced at a temperature to heat the blocking material to its reaction temperature when it reaches the blocking material in the high permeability channels, while thermal insulation provided in the lesser permeable channels by the buffer fluid can prevent heating of the blocking material in those channels to reaction temperature.

16. A method according to claim 14 or claim 15, in which the blocking material includes a thermoreactive foamable polymer material.

17. A method according to claim 1, in which the quantity of activation fluid is controlled by discontinuing the supply of activation fluid when the flow rate to the formation has reduced a predetermined degree as a result of a desired degree of blocking.

18. A method according to claim 1, claim 4 or claim 17, in which the activating fluid is a fluid adapted to react chemically with the blocking material to cause the blocking material to block the high permeability channels.

19. A method according to claim 18, in which the activating fluid is neutralized to prevent reaction between the activating fluid and the blocking material in the lesser permeable channels after the activating fluid has reacted with the blocking material in the high permeability channels and the supply of activating fluid has been discontinued.

20. A method of blocking high permeability flow channels in a formation having flow channels of high permeability and having flow channels of lesser permeability extending along the formation, which comprises:
   (a) introducing an expandible blocking material in a carrier fluid into the flow channels of the formation through an injection zone;

(b) introducing a buffer fluid into the formation through the injection zone to displace the carrier fluid and blocking material away from the injection zone to form a plug of blocking material and carrier fluid separated from the injection zone by a plug of buffer fluid, the buffer fluid being introduced to limit the degree of fingering thereof into the high permeability channels and thus provide a generally uniform interface between the two plugs;

(c) allowing the blocking material to separate out from the carrier fluid and deposit in the channels to resist displacement by fluid flowing through the channels, the blocking material being such that it does not significantly interfere with the permeability of the channels;

(d) introducing a quantity of an activating fluid into the channels at a sufficient rate for the activating fluid to present a sufficient velocity distribution between its velocity in the high permeability channels and its velocity in the lesser permeable channels for the activating fluid to finger into and reach the blocking material in the high permeability channels without reaching the blocking material in the lesser permeable channels, for the activating fluid to activate the blocking material which it reaches for the blocking material to expand to at least partially block the high permeability channels; and (e) controlling the quantity of activating fluid introduced into the channels to prevent the activating fluid from reaching the blocking material in the lesser permeable channels.

21. A method according to claim 20, in which the blocking material is an expandible synthetic plastics material.

22. A method according to claim 21, in which the blocking material is an expandible or foamable polymer material.

23. A method according to claim 22, in which the blocking material is a particulate polystyrene or polyacrylic foamable material.

* * * * *